(12) United States Patent
Surti

(10) Patent No.: US 8,387,121 B1
(45) Date of Patent: Feb. 26, 2013

(54) SYSTEM, METHOD, AND COMPUTER PROGRAM FOR AUTHENTICATING A CUSTOMER USING A NETWORK PROVIDED BY ANOTHER SERVICE PROVIDER

(75) Inventor: Mitul Surti, Vasai (IN)

(73) Assignee: Amdocs Software Systems Limited, Dublin (IE)

( * ) Notice: Subject to any disclaimer, the term of this patent is extended or adjusted under 35 U.S.C. 154(b) by 168 days.

(21) Appl. No.: 12/950,922

(22) Filed: Nov. 19, 2010

(51) Int. Cl.
G06F 21/00 (2006.01)

(52) U.S. Cl. .............................................. 726/4; 726/28

(58) Field of Classification Search ........ 455/432.1–466
See application file for complete search history.

(56) References Cited

U.S. PATENT DOCUMENTS

| | | | |
|---|---|---|---|
| 5,991,617 A | 11/1999 | Powell | |
| 6,285,871 B1 * | 9/2001 | Daniels | 455/411 |
| 6,289,223 B1 * | 9/2001 | Mukherjee et al. | 455/466 |
| 6,560,455 B2 | 5/2003 | Amin | |
| RE41,075 E | 1/2010 | Adamany et al. | |
| 2004/0152463 A1 * | 8/2004 | Grootwassink | 455/432.3 |
| 2006/0153135 A1 * | 7/2006 | Ascolese et al. | 370/331 |
| 2008/0293409 A1 * | 11/2008 | Gillot et al. | 455/433 |

* cited by examiner

*Primary Examiner* — Fikremariam A Yalew
*Assistant Examiner* — Kendall Dolly
(74) *Attorney, Agent, or Firm* — Zilka-Kotab, PC

(57) ABSTRACT

A system, method, and computer program are provided for authenticating a customer using a network provided by another service provider. In use, a message associated with a customer of a second network service provider is received from a first network service provider. Further, the message indicates usage by the customer of a network provided by the first network service provider. Additionally, in response to the receipt of the message, a request is sent from the second network service provider to the customer for authentication information. In addition, it is determined whether a valid response to the request is received by the second network service provider. Furthermore, based on the determination, the usage by the customer of the network provided by the first network service provider is conditionally blocked.

19 Claims, 4 Drawing Sheets

US 8,387,121 B1

SYSTEM, METHOD, AND COMPUTER PROGRAM FOR AUTHENTICATING A CUSTOMER USING A NETWORK PROVIDED BY ANOTHER SERVICE PROVIDER

FIELD OF THE INVENTION

The present invention relates to customer authentication, and more particularly to authenticating customers roaming on another network.

BACKGROUND

To date, a customer device can be used for roaming on networks external to the customer's home network. Typically, when the customer device is used for roaming on an external network, the external network performs a validation of an identifier associated with the customer device being used to access the external network. Unfortunately, the identifier associated with the customer device may be fraudulently copied or stolen, and subsequently used in another device, thereby deceiving the external network into allowing the other device with the fraudulent number access to the external network.

There is thus a need for addressing these and/or other issues associated with the prior art.

SUMMARY

A system, method, and computer program are provided for authenticating a customer using a network provided by another service provider. In use, a message associated with a customer of a second network service provider is received from a first network service provider. Further, the message indicates usage by the customer of a network provided by the first network service provider. Additionally, in response to the receipt of the message, a request is sent from the second network service provider to the customer for authentication information. In addition, it is determined whether a valid response to the request is received by the second network service provider. Furthermore, based on the determination, the usage by the customer of the network provided by the first network service provider is conditionally blocked.

DETAILED DESCRIPTION

Figure 1:
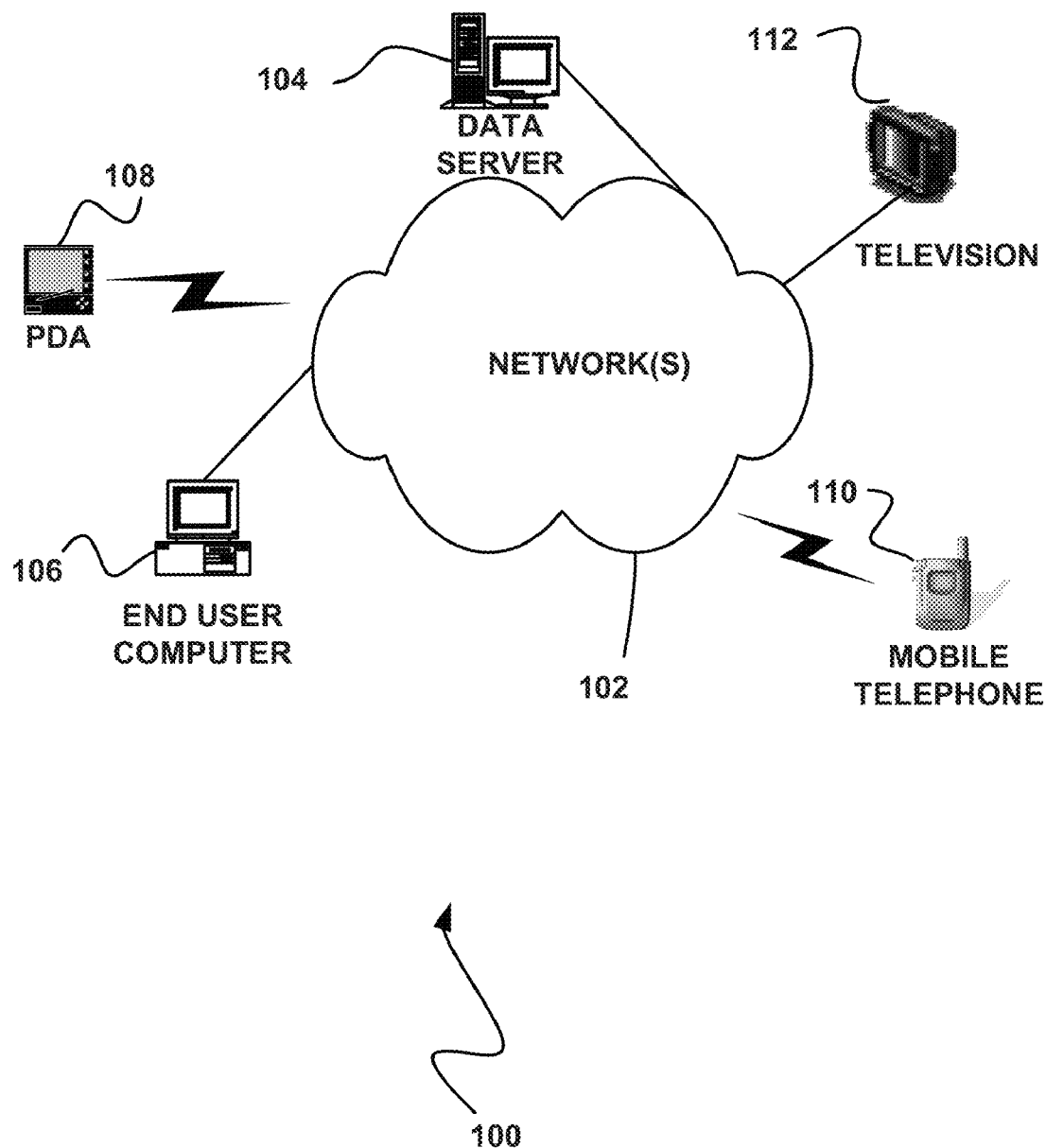
FIG. 1 illustrates a network architecture in which systems and methods consistent with aspects of the present invention may be implemented.

FIG. 1 illustrates a network architecture 100, in which systems and methods consistent with aspects related to the present invention may be implemented. As shown, network architecture 100 includes at least one network 102. The network 102 may take any form including, but not limited to a telecommunications network, a local area network (LAN), a wireless network, a wide area network (WAN) such as the Internet, peer-to-peer network, cable network, etc. Further, while only one network is shown, it should be understood that two or more similar or different networks 102 may be provided. In one example of a multi-network configuration of network 102, network 102 may comprise a wireline network (e.g., WAN, LAN, etc.) communicatively coupled to a wireless network (e.g., Universal Mobile Telecommunications System (UNITS), Global System for Mobile Communications (GSM), etc.].

As shown, several exemplary devices may be coupled to the network 102. For example, a server computer 104 and an end user computer 106 may be coupled to the network 102 for communication purposes. Such end user computer 106 may include a desktop computer, lap-top computer, and/or any other type of logic, Still yet, various other devices may be coupled to the network 102 including a personal digital assistant (PDA) device 108, a mobile phone device 110, a television 112, etc.

Figure 2:
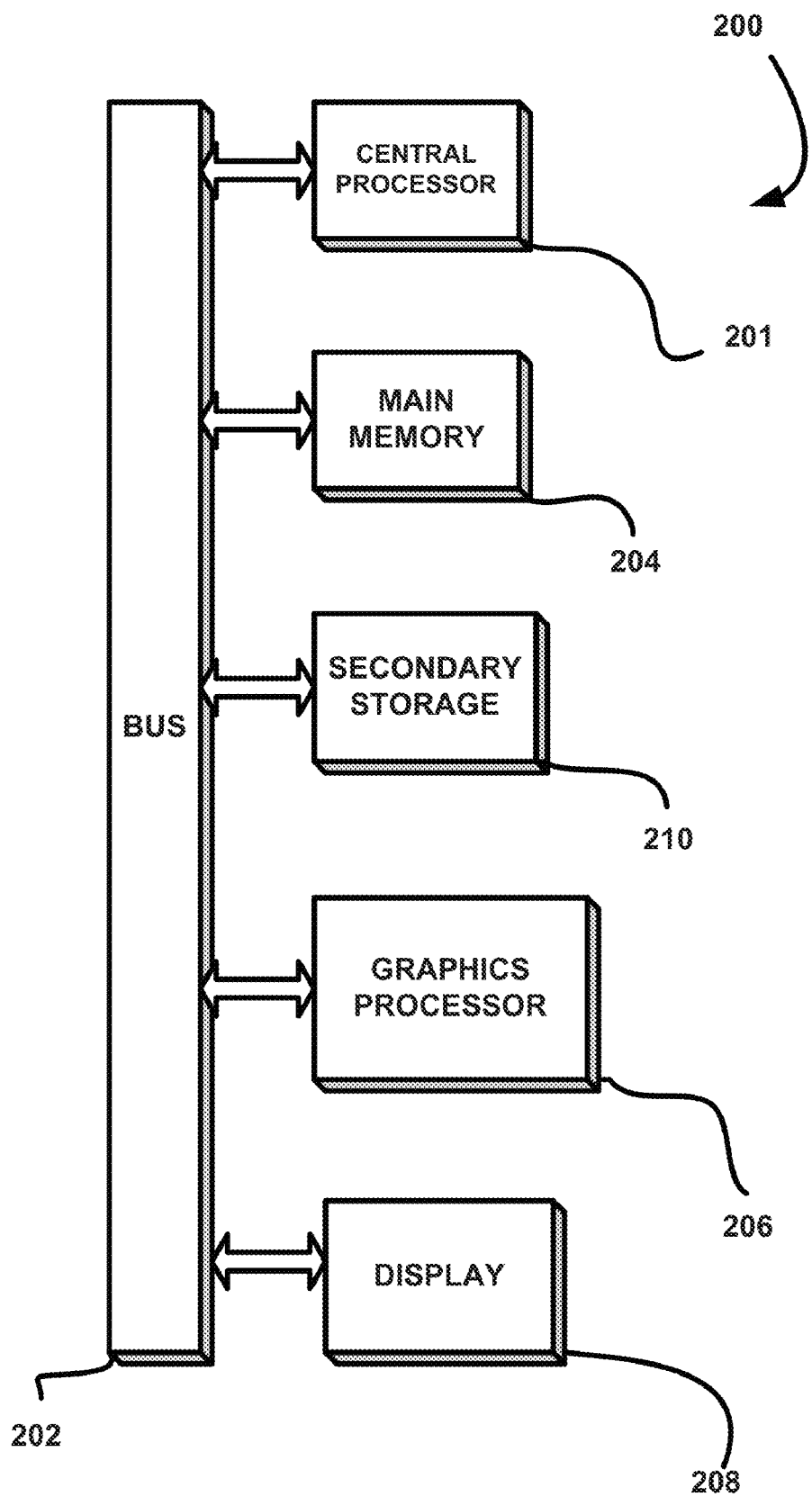
FIG. 2 is a block diagram of components of a device in which systems and methods consistent with aspects of the present invention may be implemented.

FIG. 2 is a block diagram showing components of a device 200, in which systems and methods consistent with aspects related to the present invention may be implemented. As an option, device 200 may be implemented in the context of any of the devices of the network architecture 100 of FIG. 1. Of course, the device 200 may be implemented in any desired environment.

As shown, a device 200 is provided including at least one central processor 201 which is connected to a communication bus 202. The device 200 also includes main memory 204 (e.g., random access memory (RAM)). The device 200 also includes a graphics processor 206 and a display 208.

The device 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the device 200 to perform various functions (to be set forth below, for example). Memory 204, storage 210 and/or any other storage are possible examples of tangible and/or non-transitory computer-readable media.

Figure 3:
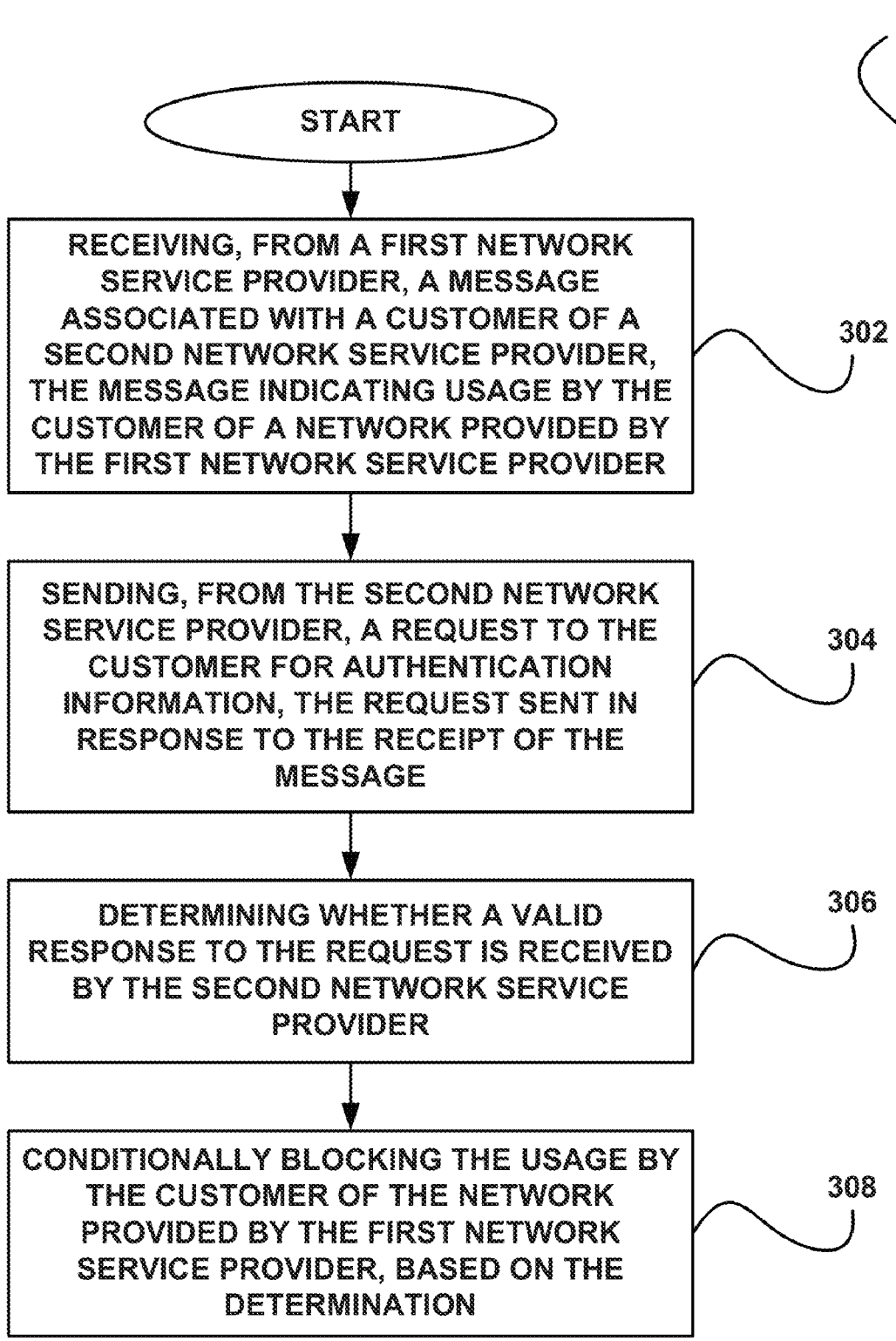
FIG. 3 illustrates a method for authenticating a customer using a network provided by another service provider, in accordance with one implementation consistent with aspects of the present invention.

FIG. 3 illustrates a method 300 for authenticating a customer using a network provided by another service provider, in accordance with one implementation consistent with aspects related to the present invention. As an option, the method 300 may be carried out using the network architecture 100 of FIG. 1 and/or the device 200 of FIG. 2. Of course, however, the method 300 may be implemented in any desired environment. Further, the aforementioned definitions may equally apply to the description below.

As shown in operation 302, a message associated with a customer of a second network service provider is received from a first network service provider, the message indicating usage by the customer of a network provided by the first network service provider. With respect to the present description, the message may include any type of message that is received from the first network service provider which indicates usage by the customer of the network provided by the first network service provider, as noted below. In various implementations, the message may include a data packet, an authorization request, a notification, a Near Real Time Roaming Data Exchange (NRTRDE) message, etc. For example, the message may be transmitted from the first network service provider to the second network service provider utilizing a network.

Further, it should be noted that with respect to the present description, the first network service provider may include any provider that provides service to a network. As an option, the first network service provider may include any provider that provides access, bandwidth, usage, etc. to the network. For example, the first network service provider may provide an access service to a network 102 of FIG. 1. Furthermore, the network provided by the first network service provider may include an access point that is used by the customer to access the network.

In addition, with respect to the present description, the customer may include a subscriber of the second network service provider. As an option, the customer may use a network provided by second network service provider, the network provided by a first network service provider, a network provided by partner network service provider, etc. For example, the network provided by second network service provider may include the customer's home network (e.g. Home Public Mobile Network (HPMN)), and the network provided by first network service provider may include any foreign, visiting, and/or roaming network (e.g. Visited Public Mobile Network (VPMN)) that is different from the customer's home network.

Optionally, the customer may roam on the visiting network provided by the first network service provider to extend a service of the customer's home network provided by the second network service provider. As an example, roaming on the visiting network may allow the customer to make voice calls, receive voice calls, send data, receive data, send a message (e.g. a Short Message Service (SMS)), receive a message, access services of the customer's home network, etc. while using the visiting network provided by the first network service provider.

As still yet another option, roaming may include the customer accessing a visiting network that does not have an entry for the customer in a home customer database of the visiting network. Optionally, the home customer database may include a home subscriber register of the network (e.g. Home Location Register (HLR), local customer database, etc.). Furthermore, as still yet another option, the visiting network that is providing roaming access to the customer may request data from a home customer database of the customer's home network to authorize the customer's roaming access to the visiting network. Additionally, after authorizing the customer's roaming access to the visiting network, the visiting network may create and/or update an entry in a visiting customer database (e.g. Visited Location Register (VLR)) indicating that the customer is allowed roaming access to the visiting network. For example, authorizing the customer's roaming access to the visiting network may include verifying with the customer's HLR that a number associated with the customer is valid.

Furthermore, with respect to the present description, the message received from the first network service provider by the second network service provider may indicate that the customer has initiated roaming on the network provided by the first network service provider. Optionally, the customer may initiate roaming on the network provided by the first network service provider by starting a voice call, receiving a voice call, starting a data session, receiving a data session, sending a Short Message Service (SMS), receiving a SMS, sending a Multimedia Messaging Service (MMS), receiving a MMS, etc. For example, after the customer of the second network service provider initiates roaming on the network provided by the first network service provider, the first network service provider may send a NRTRDE message to the second network service provider. As yet another example, after the customer of the second network service provider initiates roaming on the network provided by the first network service provider, the first network service provider may send an authorization request to the HLR of the second network service provider.

Further, as shown in operation 304, in response to a receipt of the message, a request is sent from the second network service provider to the customer for authentication information. In one implementation, the authentication information may include any information that authenticates the customer. Optionally, the authentication information may include a pass code (e.g. an alphabetic code, a numeric code, an alphanumeric code, etc.). Further, as yet another option, the authentication information may include demographic information (e.g. any information that describes the customer), For example, the demographic information associated with the user may include a first name, a last name, a maiden name, an identification number, a social security number, a driver's license number, an age, a gender, a race, an ethnicity, a location, an address, etc. Further, as an option, any of the foregoing demographic information may be used in combination or in part. Optionally, the customer and/or the second network service provider may choose the pass code and/or demographic information to use for the authentication information prior to the usage by the customer of the network provided by the first network service provider.

Still yet, as another option, the second network service provider may assign the authentication information to the customer prior to the customer roaming on the network of the first network service provider. Furthermore, as an option, the second service provider may generate the authentication information during registration of the customer, setup of the customer, configuration of the customer, activation of the customer, roaming activation of the customer, etc. and may store the authentication in association with the customer. For example, during the registration of the customer with the second service provider, the second service provider may generate the authentication information for the customer and may store the authentication information in a Home Location Register of the second service provider.

Furthermore, as still yet another option, the customer may provide the authentication information to the second network service provider. Additionally, as an option, the customer may generate the authentication information during a registration of the customer, a setup of the customer, a configuration of the customer, an activation of the customer, a roaming activation of the customer, etc. and second network service provider may store the authentication information in association with the customer. For example, during the registration of the customer with the second service provider, the customer may provide the authentication information to the second service provider and the second service provider may store the authentication information in a database such as a Home Location Register.

Still yet, an option, the request sent from the second network service provider to the customer for authentication information may include any request for authentication information. Optionally, the request may include a notification, an alert, a SMS message, an email, a voicemail, etc. that requests the authentication information from the user. For example, in response to receiving a message associated with the customer roaming on the network of the first service provider, the second service provider may send a request for authentication information to the customer. As yet another option, the second network service provider may send the request to the customer for authentication information in parallel with the usage by the customer of a network provided by the first network service provider.

Additionally, as shown in operation 306, it is determined whether a valid response to the request is received by the second network service provider. In one implementation, the response may include the authentication information of the customer requested by the second network service provider. Optionally, the customer may send the authentication information to the second network service provider in any desired manner. For example, the authentication information may be received from the customer by the second network service provider via a SMS, an Interactive Voice Response (IVR), an email, an instant message, an application, a website, and/or any immediate form of communication.

Further, as another option, the second network service provider may determine whether a valid response to the request was received. Additionally, as an option, the second network service provider may compare the authentication information received from the customer with known authentication information (e.g. the stored authentication information) to determine if the authentication information is valid. For example, valid authentication information may ensure that a user using the network provided by the first network service provider for roaming access is the customer. As an example, invalid authentication information may indicate that the user using the network provided by the first network service provider for roaming access is not the customer and may be fraudulent. Further, as yet another example, determining that the authentication information is valid may provide a high degree of certainty that the customer is actually the user roaming on the network of the first service provider.

In addition, as shown in operation 306, the usage by the customer of the network provided by the first network service provider is conditionally blocked based on the determination. In another embodiment, the second network service provider may block the usage by the customer of the network provided by the first network service provider based upon by the determination. As an option, if the second network service provider determines that the authentication information provided by the customer is valid, then the second network service provider may allow the customer to continue roaming on the network provided by the first network service provider. As yet another option, if the second network service provider determines that the authentication information provided by the customer is invalid, then the second network service provider may block the customer from roaming on the network provided by the first network service provider.

Furthermore, as still yet another option, prior to the determination that the authentication information provided by the customer is valid or invalid, the second network service provider may allow the customer to roam on the network provided by the first network service provider. For example, prior to the second network service provider determining that the customer's authentication information is valid or invalid, the second network service provider may allow the customer to roam on the network provided by the first network service provider.

In yet another embodiment, the request sent to the customer for the authentication information may timeout prior to the second network service provider receiving any authentication information from the customer as a response to the request. As an option, the timeout may be predetermined and may include a time period for receiving the authentication information from the customer.

Optionally, in response to the time period for receiving the authentication information from the customer being exceeded, the second network service provider may resend the request to the customer for authentication information. As another option, in response to the time period for receiving the authentication information from the customer being exceeded, the second network service provider may block the customer from roaming on the network provided by the first network service provider.

Still yet, as another option, in response to the second network service provider determining that the authentication information provided by the customer is invalid and/or in response to exceeding the time period for receiving the authentication information from the customer, the second network service provider may black list the customer from roaming, thereby preventing the customer from roaming. For example, the second network service provider may black list the customer from roaming for a period of time, until the customer provides valid authentication information, etc.

In addition, as yet another option, in response to the second network service provider determining that the authentication information provided by the customer is invalid and/or in response to exceeding the time period for receiving the authentication information from the customer, the second network service provider may raise an alert. For example, the alert raised by the second network service provider may include any notification, message, etc. that the usage by the customer of the network provided by the first network service provider is potentially fraudulent.

Additionally, as an option, the usage by the customer of the network provided by the first network service provider may be analyzed. Optionally, the usage may be analyzed in response to the second network service provider determining that the authentication information provided by the customer is invalid, in response to exceeding the time period for receiving the authentication information from the customer, etc. For example, analyzing the usage by the customer of the network provided by the first network service provider may include storing any information associated with the usage by the customer of the network, and determining if the usage by the customer of the network is suspect, improper, fraudulent, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
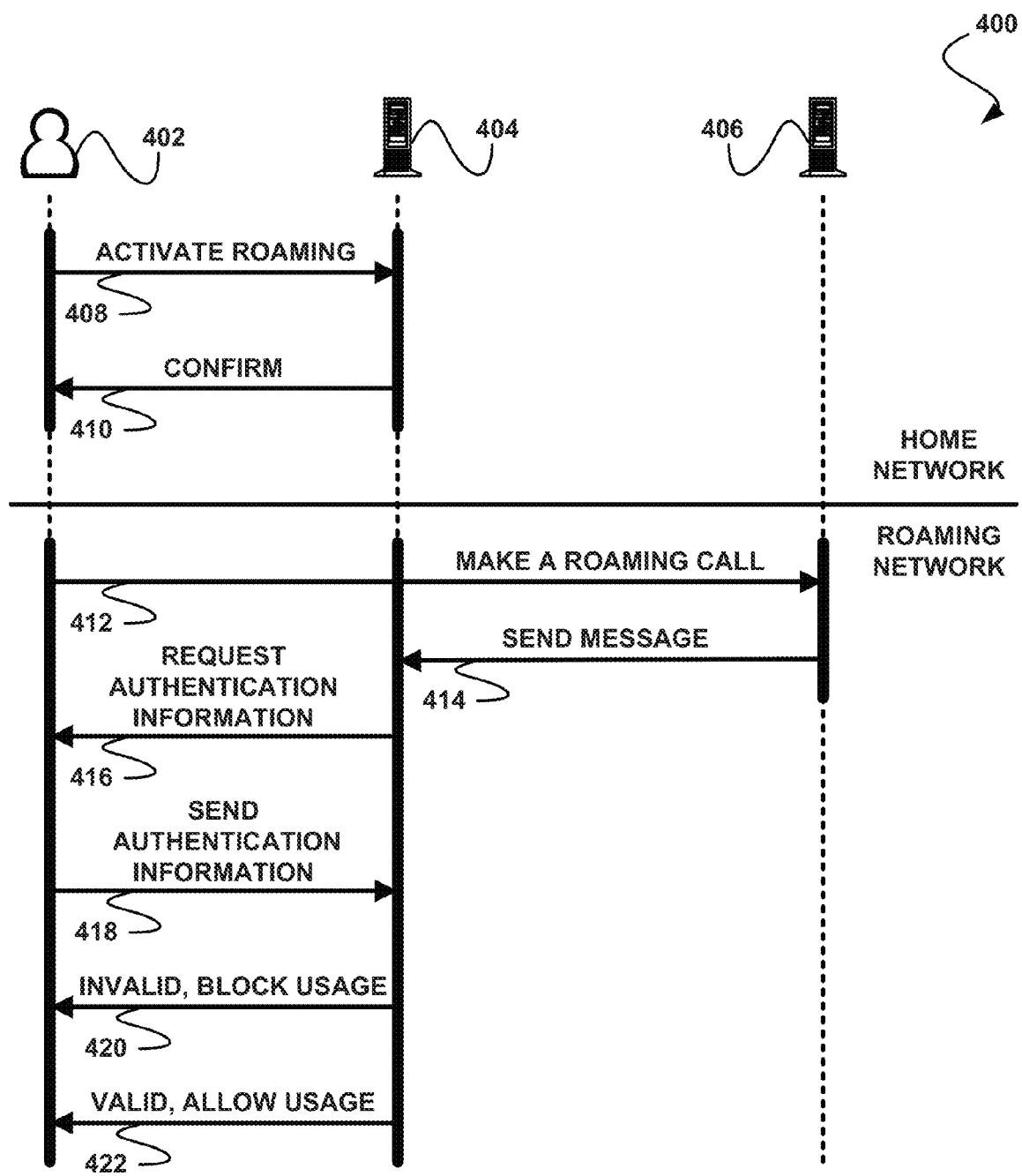
FIG. 4 illustrates a system for authenticating a customer using a network provided by another service provider, in accordance with another implementation consistent with aspects of the present invention.

FIG. 4 illustrates a system 400 for authenticating a customer using a network provided by another service provider, in accordance with another implementation consistent with aspects of the present invention. As an option, the system 400 may be implemented in the context of the details of FIGS. 1-3. Of course, however, the system 400 may be implemented in any desired environment. Further, the aforementioned definitions may equally apply to the description below.

As shown, a customer 402 is in communication with a home network 404 via a network. The customer 402 may use any electronic device that may communicate with the home network 404 via a network, a wired link, a wireless link, etc. Further, the electronic device may include a handheld device, a mobile phone, a handheld device, a mobile computer, a laptop, a desktop, a server, etc. Additionally, the home network 404 may include any network that the customer 402 has subscribed to, a Home Public Mobile Network (HPMN), etc.

Furthermore, as shown, a roaming network 406 is in communication with the customer 402 and the home network 404. For example, the roaming network 406 may communicate with the customer 402 and/or the home network 404 via a network, a wired link, a wireless link, etc. In addition, the roaming network 406 may include any network that is separate from the customer's home network 404, a Visited Public Mobile Network (VPMN), etc.

Additionally, as shown, the customer 402 activates roaming 408 with the home network 404. As an option, the customer 402 may activate roaming at any time prior to attempting to roam on another network (e.g. the roaming network 406). For example, the customer 402 may activate roaming during registration, during roaming activation, and/or any time prior to roaming. Optionally, while activating roaming, the customer 402 may indicate authentication information to the home network 404 to be later used to authenticate the user. As yet another option, while activating roaming, the home network 404 may indicate authentication information to the customer 402 to be later used to authenticate the user.

Further, after the customer 402 activates roaming with the home network 404, the home network confirms 410 the activation with the customer 402. As an option, the home network 404 may indicate authentication information to the customer 402 while confirming 410 with the customer 402. For example, the customer 402 may request activation of roaming with the home network 404, the home network 404 may confirm 410 the activation of roaming, and the home network 404 may provide the customer 402 with an authentication code to use while roaming on another network. Furthermore, as an option, the home network 404 may store the indicated authentication information for later use in authenticating the customer 402 while the customer 402 is using a roaming network 406.

As shown, the customer 402 makes a roaming call 412 using the roaming network 406. As an option, the roaming call 412 may include any action initiated by the customer 402 while using the roaming network 406. For example, the action may include the customer 402 making a voice call, receiving a voice call, holding a voice call, sending data, receiving data, sending a Short Message Service (SMS), receiving a SMS, etc. while using the roaming network 406.

After the customer 402 makes the roaming call 412 using the roaming network 406, the roaming network 406 sends a message 414 to the home network 404. As an option, the message 414 from the roaming network 406 may include a NRTRDE message, an authorization request, etc. to the home network 404. For example, after the customer 402 makes a roaming call using the roaming network 406, the roaming network 406 sends a NRTRDE message to the home network 404 indicating that the customer 402 has initiated a roaming call using the roaming network 406.

Further, in response to receiving the message 414 from the roaming network 406, the home network 404 sends a request for authentication information 416 to the customer 402. Optionally, the request for authentication information 416 is sent to the customer 402 in parallel to and/or after the customer 402 has made the roaming call 412 using the roaming network 406. For example, the customer 402 may initiate roaming on the roaming network 406 by making the roaming call 412, whereby the roaming network 406 then sends the message 414 to the home network 404, and the home network 404 then sends the request for authentication information 416 to the customer 402 while the customer 402 is using the roaming network 406.

In response to the request for authentication information 416, the customer 402 sends the authentication information 418 to the home network 404. As an option, the customer 402 may send the authentication information by any method capable of communicating the authentication information to the home network 404. For example, the customer 402 may send the authentication information via a SMS, an Interactive Voice Response (IVR), etc.

Furthermore, as an option, if the home network 404 does not receive the requested authentication information from the customer 402 before a time period expires, then the home network 404 may resend the request for authentication information 416 to the customer 402. As yet another option, if the home network 404 does not receive the requested authentication information from the customer 402 before a time period expires, then the home network 404 may black list the customer 402 thereby preventing the customer 402 from roaming on the roaming network 406. Optionally, the black list may prevent the customer 402 from roaming for a period of time, until valid authentication information is received from the customer 402, etc.

Additionally, in response to the home network 404 receiving the authentication information from the customer 402, the home network 404 determines if the received authentication information is valid or invalid. As an option, the home network 404 may determine if the received authentication information is valid or invalid by comparing the received authentication information from the customer 402 with authentication information indicated while activating roaming or confirming roaming activation with the customer 402. For example, after receiving the authentication information from the customer 402, the home network 404 may look up stored authentication information associated with the customer 402 in a database, and then compare the stored authentication information with the received authentication information to determine if there is a match. In continuing the current example, if the stored authentication information matches the received authentication information, then the received authentication information is determined to be valid, and if the stored authentication information does not match the received authentication information, then the received authentication information is determined to be invalid.

If the home network 404 determines that the received authentication information is valid, then the home network 404 continues to allow usage 422 of the roaming network 406 by the customer 402. Further, if the home network 404 determines that the received authentication information is invalid, then the home network 404 blocks usage 422 of the roaming network 406 by the customer 402. As an option, blocking usage of the roaming network 406 by the customer 402 may include instructing the roaming network 406 to disallow roaming for the customer 402, instructing the roaming network 406 to terminating an active roaming call for the customer 402, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
computer code for receiving, from a first network service provider, a message associated with a customer of a second network service provider, the message indicating usage by the customer of a network provided by the first network service provider;

computer code for sending, from the second network service provider, a request to the customer for authentication information, the request sent in response to the receipt of the message;

computer code for determining whether a valid response to the request is received by the second network service provider; and computer code for conditionally blocking the usage by the customer of the network provided by the first network service provider, based on the determination;

wherein the computer program is operable such that the usage by the customer of the network provided by the first network service provider is further blocked based on exceeding a time period for receiving a response to the request from the customer;

wherein the message associated with the customer of the second network service provider includes a Near Real Time Roaming Data Exchange (NRTRDE) message;

wherein the NRTRDE message is received from the first network service provider after the customer initiates roaming on the network provided by the first network service provider.

2. The computer program of claim 1, wherein the authentication information includes a pass code.

3. The computer program of claim 1, wherein the authentication information includes demographic information.

4. The computer program of claim 1, wherein the customer of the second network service provider includes a subscriber of the second network service provider.

5. The computer program of claim 1, wherein the network provided by the first network service provider includes a roaming network.

6. The computer program of claim 1, wherein the customer initiating the roaming on the network provided by the first network service provider includes at least one of starting a voice call, receiving a voice call, starting a data session, receiving a data session, sending a Short Message Service (SMS), and receiving a SMS.

7. The computer program of claim 1, wherein the message associated with the customer of the second network service provider includes an authorization request to a home location register (HLR) of the second network service provider.

8. The computer program of claim 1, wherein the authentication information is received from the customer by the second network service provider via SMS as the response to the request.

9. The computer program of claim 1, wherein the authentication information is received from the customer by the second network service provider via Interactive Voice Response (IVR) as the response to the request.

10. The computer program of claim 1, wherein the computer program is operable such that the usage by the customer of the network provided by the first network service provider is allowed prior to the second network service provider receiving the authentication information from the customer.

11. The computer program of claim 1, wherein the determining of whether the valid response to the request is received by the second network service provider includes receiving the response to the request from the customer and comparing the response to the request to known information associated with the customer.

12. The computer program of claim 1, wherein the computer program is operable such that the time period for receiving the response to the request from the customer is predetermined.

13. The computer program of claim 1, wherein the computer program is operable such that another request is sent to the customer for the authentication information after exceeding the time period for receiving the response to the request from the customer.

14. The computer program of claim 1, further comprising computer code for analyzing the usage by the customer of the network provided by the first network service provider based on the second network service provider receiving an invalid response to the request.

15. A method, comprising:

receiving, from a first network service provider, a message associated with a customer of a second network service provider, the message indicating usage by the customer of a network provided by the first network service provider;

sending, from the second network service provider, a request to the customer for authentication information, the request sent in response to the receipt of the message;

determining whether a valid response to the request is received by the second network service provider, utilizing a processor; and conditionally blocking the usage by the customer of the network provided by the first network service provider, based on the determination;

wherein the usage by the customer of the network provided by the first network service provider is further blocked based on exceeding a time period for receiving a response to the request from the customer;

wherein the message associated with the customer of the second network service provider includes a Near Real Time Roaming Data Exchange (NRTRDE) message;

wherein the NRTRDE message is received from the first network service provider after the customer initiates roaming on the network provided by the first network service provider.

16. A system, comprising:

a processor for:

receiving, from a first network service provider, a message associated with a customer of a second network service provider, the message indicating usage by the customer of a network provided by the first network service provider;

sending, from the second network service provider, a request to the customer for authentication information, the request sent in response to the receipt of the message;

determining whether a valid response to the request is received by the second network service provider; and conditionally blocking the usage by the customer of the network provided by the first network service provider, based on the determination;

wherein the system is operable such that the usage by the customer of the network provided by the first network service provider is further blocked based on exceeding a time period for receiving a response to the request from the customer;

wherein the message associated with the customer of the second network service provider includes a Near Real Time Roaming Data Exchange (NRTRDE) message;

wherein the NRTRDE message is received from the first network service provider after the customer initiates roaming on the network provided by the first network service provider.

17. The system of claim 16, wherein the processor is coupled to memory via a bus.

18. The computer program of claim 14, wherein analyzing the usage by the customer of the network includes storing information associated with the usage by the customer of the network and determining if the usage by the customer of the network is fraudulent.

19. The computer program of claim 1, wherein in response to the second network service provider determining that the authentication information provided by the customer is invalid, the second network service provider sends a notification that the usage by the customer of the network provided by the first network service provider is potentially fraudulent.

* * * * *